(No Model.) 2 Sheets—Sheet 1.
J. H. COUPER.
ACETYLENE GAS GENERATOR.
No. 578,972. Patented Mar. 16, 1897.

WITNESSES: T. B. Ford, S. M. Wood.

INVENTOR James H. Couper,
BY A. A. Wood & Son
ATTORNEYS (No Model.) 2 Sheets—Sheet 2.

J. H. COUPER.
ACETYLENE GAS GENERATOR.

No. 578,972. Patented Mar. 16, 1897.

WITNESSES:
T. B. Ford
J. M. Wood

INVENTOR
James H. Couper,
BY
A. A. Woodson
ATTORNEYS

UNITED STATES PATENT OFFICE.

JAMES H. COUPER, OF ATLANTA, GEORGIA, ASSIGNOR OF ONE-HALF TO JOHN M. SITTON AND THOMAS V. HUBBARD, OF SAME PLACE.

ACETYLENE-GAS GENERATOR.

SPECIFICATION forming part of Letters Patent No. 578,972, dated March 16, 1897.

Application filed November 4, 1896. Serial No. 611,077. (No model.)

*To all whom it may concern:*

Be it known that I, JAMES H. COUPER, a citizen of the United States, and a resident of Atlanta, in the county of Fulton and State of Georgia, have made a certain new and useful Improvement in Acetylene-Gas Generators; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention relates to the manufacture of the gas commercially known as "acetylene," said gas being evolved from calcium carbid in its reaction with water.

The object of the invention is to produce a device of this class which may be charged with a considerable quantity of calcium carbid regardless of the output of gas required, whereby expert knowledge of the machine will not be required of consumers, to provide for the automatic substitution of a charged generator for an exhausted one, to provide means whereby the generator may continuously produce gas until its entire charge is neutralized, and, further, to provide advantageous details of construction, all of which is hereinafter fully specified.

The invention is illustrated in the accompanying drawings, in which—

Figure 1:
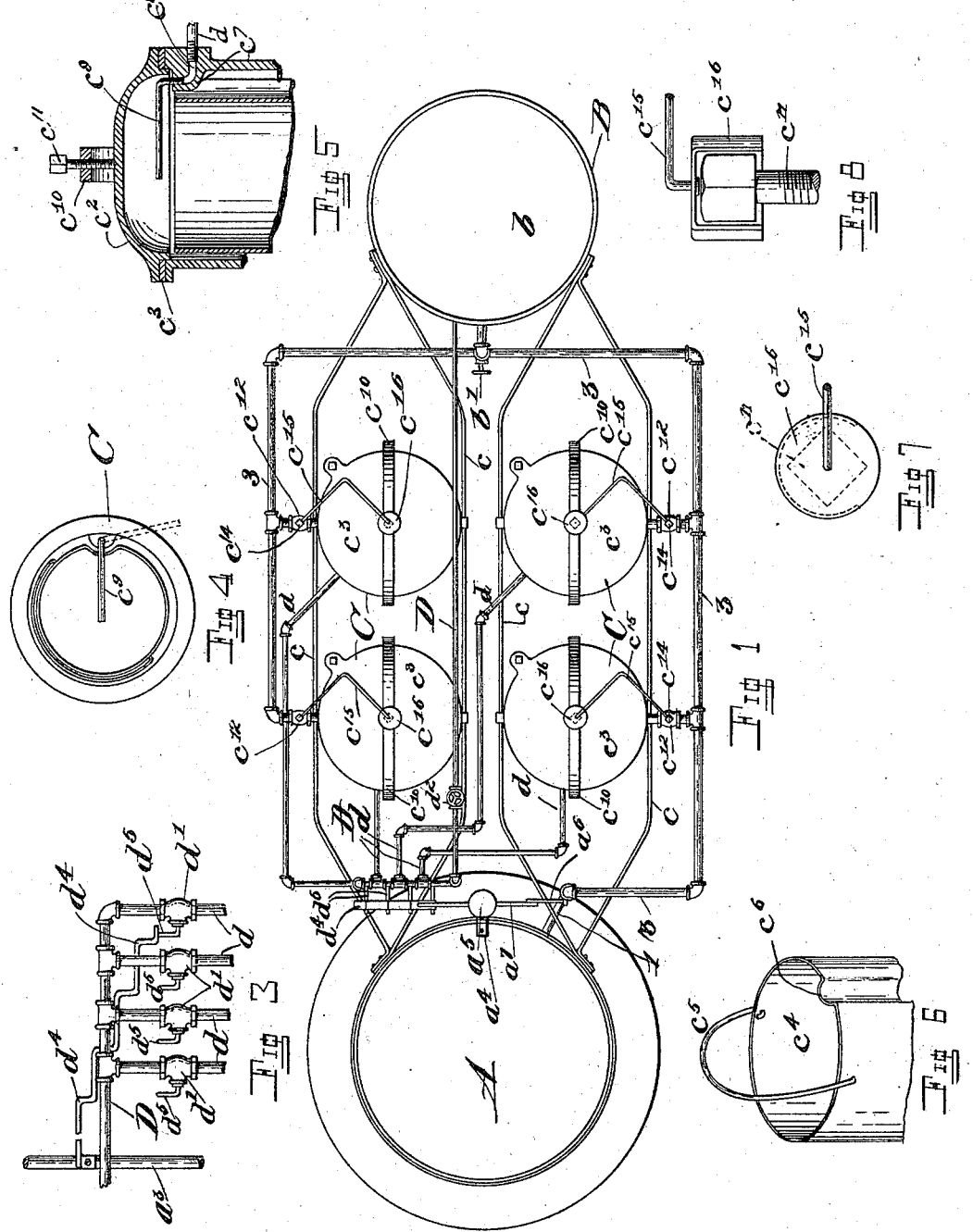
Figure 2:
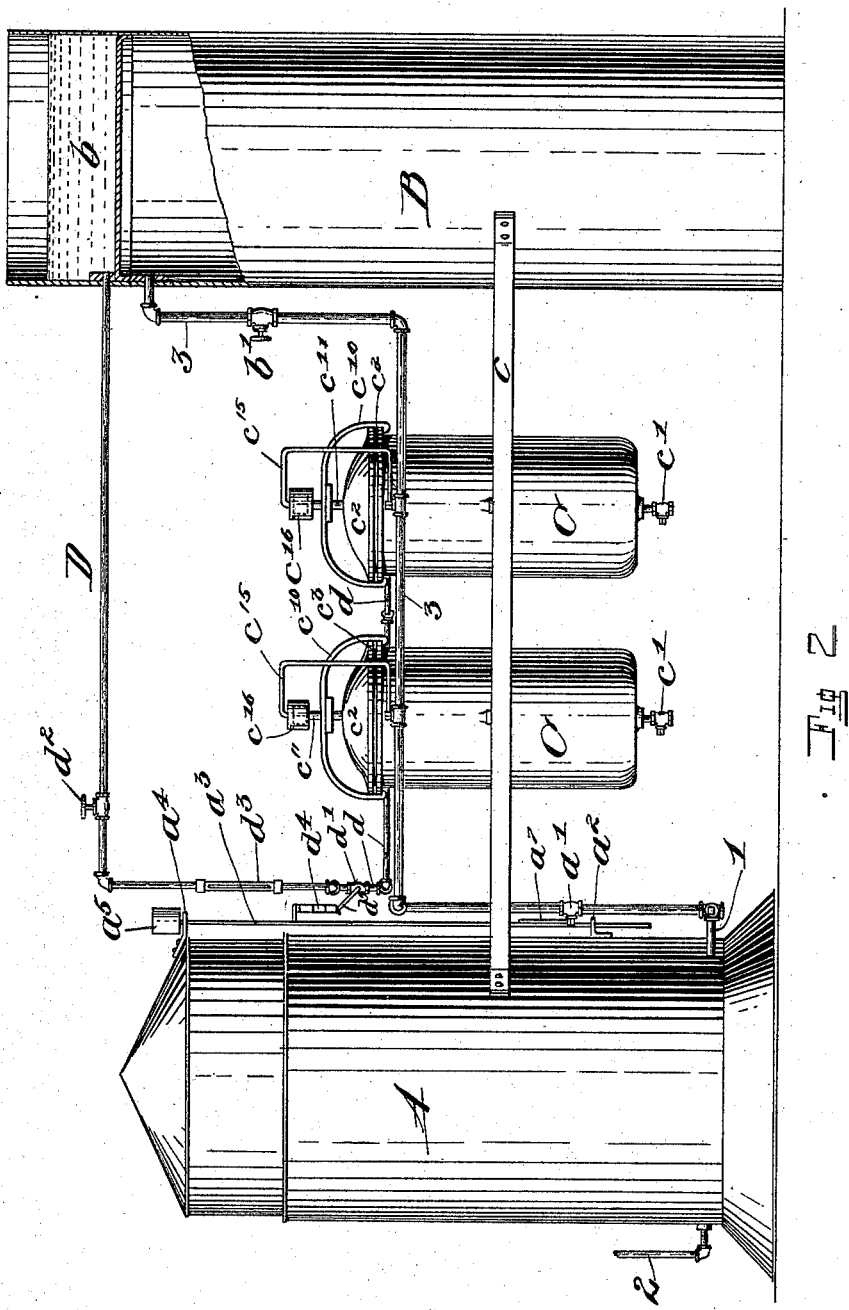

Figure 1 is a plan view of the device. Fig. 2, Sheet 2, is a side elevation thereof. Fig. 3 is a detail elevation of the valves governing the water-supply and mechanism for supporting same separate and consecutive. Fig. 4 is a detail plan view of the generator with its cap removed and its carbid-bucket in place. Fig. 5 is a fragmentary detail of said generator with the cap and clamp in place thereon. Fig. 6 is a fragmentary detail in perspective, showing a bucket and a corrugation therein. Fig. 7 is a plan of the shield for the clamp set-screw. Fig. 8 is a side elevation thereof.

In the figures like reference-characters are uniformly employed in the designation of corresponding elements of construction.

A is a low-pressure holder which is preferably in the form of an expansible gasometer having an inlet-pipe 1 and an outlet or service pipe 2.

B is a high-pressure holder which is made in the form of a cylindrical chamber of sufficient strength to sustain tension of about ten atmospheres per square inch. The side walls of the holder B are extended upwardly, as shown at $b$, and form a reservoir for water to be used in producing a reaction in the generators.

Sustained on bars $c$, secured at their extremities to and projecting between the holders A and B, are the generators C, which consist of cylindrical vessels having drain-cocks $c'$ in their lower ends and having their upper ends flanged, covers $c^2$ serving to close said open ends, an elastic gasket $c^3$ being provided to insure a gas-tight joint, if found necessary.

Within the generator C is a bucket $c^4$, having a bail $c^5$ for removal and preferably being as large as may be inserted within said generator, and the side of said bucket being provided with a corrugation $c^6$ for the purpose of avoiding the lug $c^7$. This lug $c^7$ projects inwardly from the side of said generator and has a passage $c^8$ through it, the perforated dropping-tube being screwed into its inner end and the water-supply tube being screwed into its outer end. The spray-tube $c^9$ is swiveled, so as to turn into the position, as shown in broken lines, Fig. 4, in order that the bucket $c^4$ may be removed for cleansing or recharging. The cover $c^2$ is held in place by means of a shackle or clamp $c^{10}$, which engages by its hooked ends with the flange on the upper end of the generator and is provided with a screw $c^{11}$, which bears its point upon the upper side of the cover $c^2$.

3 is the gas-pipe of the apparatus, which is connected with both holders A and B and with all of the generators C, no matter how many of the latter there may be. Valves $c^{12}$ govern the passages from the generator C to the said pipe 3, and valve $b'$ governs the passage from the said pipe 3 into the high-pressure holder B, and the valve $a'$ governs the passage from said pipe into the holder A. Secured to each of the stems $c^{14}$ of the valves $c^{12}$ is an arm $c^{15}$, which swings around said valve when stem $c^{14}$ is opening or closing the valve and carries, rotatably mounted on its end, a shield $c^{16}$, which has an opening in its side, as best shown in Fig. 8, of sufficient size so that when the valve $c^{12}$ is opened said shield will be swung into position over the upper end of the set-screw $c^{11}$. This prevents the removal of the cover $c^3$ when the corresponding valve $c^{12}$ is open and communication is established between the correlative generator and the gas-holders.

Sliding in the guide $a^2$ is a rod $a^3$, the upper end of which passes through a guide $a^4$, secured to the upper end of the movable section of the gasometer A. $a^5$ being a weight causes the said rod to follow the vertical movements of said movable section until it shall be desirable for the movement of said rod to cease. The valve $a'$ is provided with a stem $a^6$, which stem is connected with an arm $a^7$ on said rod $a^3$, whereby the downward movement of said movable section of the gasometer will permit the weight $a^5$ to press the rod $a^3$ downwardly and so open the said valve $a'$ and allow the passage of gas through the pipes 3 and 1 either from the high-pressure holder B or from the generator. As soon as the low-pressure holder A shall start on its upward movement the said valve will start to close, and when the said movable section shall reach its upward limit said valve will be closed and remain closed until said movable section again descends, due to the depletion of gas by use. D is a pipe which extends from the water-reservoir $b$ to the point near the low-pressure holder A, where it is provided with a number of branches $d$, each one of which is provided with a self-closing valve $d'$, and extends to one of the generators C, thus connecting each generator independently with the water-supply. $d^2$ is a valve controlling said pipe, and $d^3$ is a sight-feed incorporated therein.

Secured to the rod $a^3$ is an arm $d^4$, which extends downwardly at an angle or has formed therein a series of progressively-formed steps, as shown in Fig. 3, which arm $d^4$ is adapted to successively contact with the levers $d^5$ of the valves $d'$. As aforesaid, the depression of the movable element of the gasometer allows the weight $a^5$ to press downwardly upon the movable rod $a^3$. Now upon the first depression after the initial filling of the holder A the lower step or point of the arm $d^4$ contacts with the first one of the levers $d^5$ and so turns water into the correlative generator, which obviously starts the evolution of gas in said generator, and continues same until the movable element of the holder A again rises toward its upward limit, when the spring in the valve $d'$ will close it and prevent a further flow of water into the correlative generator and, as aforesaid, close the valve $a'$, whereupon the gas being generated in said generator will flow to the high-pressure holder B. Each depression of the rod $a^3$ opens the valve $a'$, but the valve $d'$ will not be opened until upon the opening of the valve $a'$ no gas flows from the holder B to the holder A, whereupon the rod $a^3$ will be further depressed by the continued sinking of the movable part of the gasometer, and the stepped bar brought into contact with the end of the first lever $d^5$, which sends the water to the corresponding generator, and as soon as the generation of gas starts therein gas will flow to the gasometer until it is filled, when the valves will be closed and the gas generated will be sent to the high-pressure holder B. After the generator in the water-circuit of which the first valve $d'$ is located shall have become exhausted of active calcium carbid a little further descent of the rod $a^3$ will bring the next step of the arm $d^4$ into contact with the lever $d^5$ of the next valve in the series and will start the evolution of gas from the correlative generator C, this action taking place upon the exhausting of gas-pressure from the holder B and continuing until the active carbid in all of the generators shall be neutralized.

Having thus described my invention, what I claim as new, and desire to secure by Letters Patent of the United States, is—

1. In an acetylene-gas generator, a gasometer, and a holder capable of sustaining a high tension, a pipe entering the gas-space of both, a multiplicity of generators connected to said pipe and means for successively and automatically starting said generators upon the successive reductions of the gas-pressure in said gasometer below a given point, for the purposes specified.

2. In an acetylene-gas generator, a gasometer, a series of generators, pipes interconnecting same and extended to said gasometer, a water-supply source, and a pipe leading therefrom having branch pipes leading one to each generator, valves in said branch pipes and substantially in line, and a stepped arm carried on the movable element of the gasometer adapted to contact its steps successively with said valves, substantially as and for the purpose specified.

3. In an acetylene-gas generator, a gasometer, a series of generators, pipes interconnecting same and said gasometer, a water-supply source, a pipe leading therefrom, having branch pipes, one leading to each generator, a throttle-valve in each branch pipe, said throttle-valves being arranged substantially in line, guides on said gasometer one of which guides is carried on the movable element of said gasometer, a rod mounted slidably in said guides and having a weight on its upper end, said weight resting on top of the guides on said movable gasometer element and a stepped arm carried on said rod and adapted to successively strike and depress the levers of said valves, substantially as and for the purpose specified.

4. In an acetylene-gas generator, a gasometer and a generator, comprising a cylinder and a cap therefor, a stirrup adapted to engage said cylinder, a set-screw therein bearing normally on said cap, a pipe connecting said generator and gasometer, a valve therein, an arm on the stem of said valve, and an open-sided shield on the distal extremity of said arm adapted to swing over and guard the head of said set-screw against the affixing of a wrench, for the purpose specified.

5. In an acetylene-gas generator, a gasometer and a generator, comprising a cylinder and a cap therefor, a stirrup adapted to engage said cylinder, and a set-screw therein bearing normally on said cap, a pipe connecting said generator and gasometer, a valve therein, an arm on the stem of said valve, and an open-sided shield rotatably mounted on the distal extremity of said arm adapted to swing over and guard the head of said set-screw against the affixing of a wrench, for the purpose specified.

6. In an acetylene-gas generator, a gasometer, a high-pressure holder, bars extending between said gasometer and holder, a series of generators, secured to and suspended upon said bars, pipes interconnecting same and said gasometer and high-pressure holder, a water-supply source, and a pipe leading therefrom having branch pipes, one leading to each generator, a throttle-valve in each branch pipe, said throttle-valves being arranged substantially in line, guides on said gasometer one of which guides is carried on the movable element and a stepped arm carried on said rod and adapted to successively strike and depress the levers of said valves, substantially as and for the purpose specified.

In testimony whereof I hereunto affix my signature in presence of two witnesses.

JAMES H. COUPER.

Witnesses:
A. P. WOOD,
GILES P. BAUGH.